United States Patent [19]
Aoi

[11] 3,999,967
[45] Dec. 28, 1976

[54] APPARATUS FOR PURIFYING EXHAUST GAS

[76] Inventor: Katashi Aoi, No. 840, Juniso, Kamakura, Kanagawa, Japan

[22] Filed: May 7, 1975

[21] Appl. No.: 575,393

[30] Foreign Application Priority Data

| May 16, 1974 | Japan | 49-54992[U] |
| May 16, 1974 | Japan | 49-54993[U] |
| Apr. 9, 1975 | Japan | 50-46966[U] |
| Apr. 9, 1975 | Japan | 50-46967[U] |

[52] U.S. Cl. .................. 55/210; 55/267; 55/DIG. 30; 55/319; 123/119 A; 60/311
[51] Int. Cl.² .................. B01D 46/00; F01N 3/02
[58] Field of Search ......... 60/279, 311; 123/119 A; 55/267–269, DIG. 30, 213, 210, 319; 137/512.1, 516.11; 181/56, 65

[56] References Cited
UNITED STATES PATENTS

| 1,800,771 | 4/1931 | Best | 60/279 |
| 3,421,315 | 1/1969 | Aoi | 55/DIG. 30 |
| 3,618,576 | 11/1971 | Dixon | 60/279 |
| 3,715,867 | 2/1973 | Aoi | 55/269 |
| 3,860,403 | 1/1975 | Aoi | 55/269 |

*Primary Examiner*—Bernard Nozick
*Attorney, Agent, or Firm*—Haseltine, Lake & Waters

[57] ABSTRACT

An apparatus for purifying exhaust gas having an exhaust gas purifier and a recovering pipe extending from the exhaust gas purifier to a suction device of an internal-combustion engine. The exhaust gas purifier collects soot, etc., in the exhaust gas to purify the exhaust gas under an action of adiabatic expansion, which exhaust gas is discharged from the engine. The recovering pipe feeds the soot, etc., with the gas purified by the exhaust gas purifier into the suction device in which the soot, etc., and the purified gas are mixed into fresh air for combustion.

4 Claims, 8 Drawing Figures

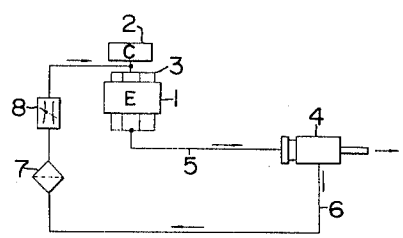
FIG. 1
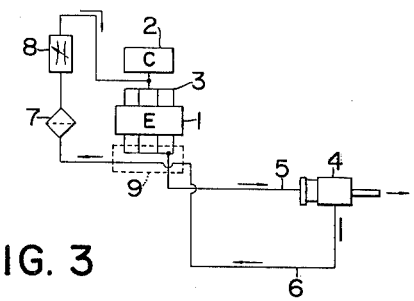
FIG. 2
FIG. 3
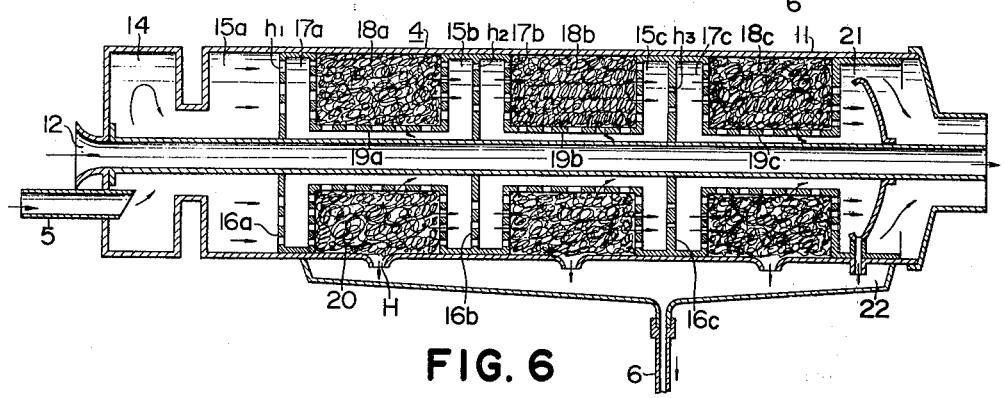
FIG. 6
QUANTITIES OF EXHAUST PARTICULATES AND
LIQUID TRAPPED VERSUS RUNNING DISTANCE
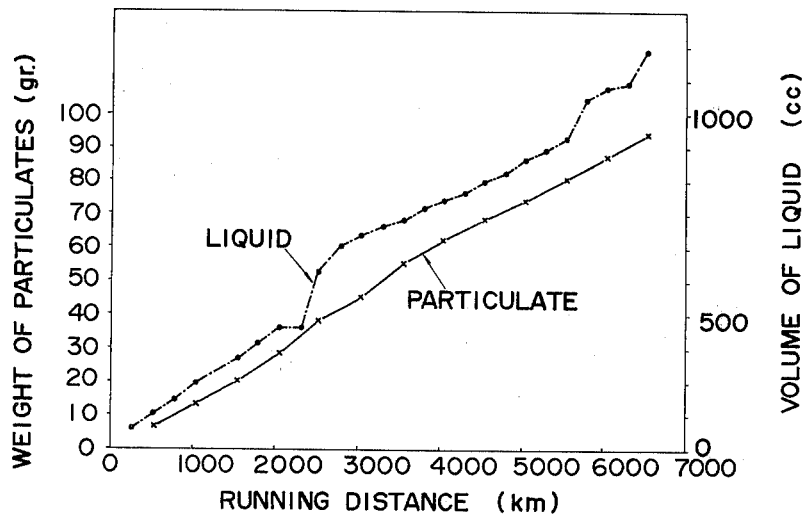

FIG. 7

QUANTITATIVE ANALYSIS OF EXHAUST PARTICULATES

| GASOLINE AUTOMOBILE | | | DIESELENGINE AUTOMOBILE | | |
|---|---|---|---|---|---|
| SYMBOLS OF ELEMENTS | ELEMENTS | | SYMBOLS OF ELEMENTS | ELEMENTS | |
| Pb | LEAD | 30.950 % | Pb | LEAD | 0.001 % |
| Mn | MANGANESE | 0.070 % | Mn | MANGANESE | 0.005 % |
| Zn | ZINC | 0.300 % | Zn | ZINC | 0.31 % |
| Ba | BARIUM | 0.270 % | Ba | BARIUM | 0.24 % |
| | | | Hg | MERCURY | 0.01 PPM* |

*  BY VOLUME

THE ANALYSIS WAS MADE ON THE ELEMENT PARTICULARLY POISONOUS TO HUMAN BODY.

FIG. 8

QUANTITATIVE ANALYSIS OF EXHAUST LIQUID FROM GASOLINE AUTOMOBILE

| | COMPONENTS | |
|---|---|---|
| Pb | LEAD | 2.14 g / 100 ml |
| $SO_4^{2-}$ | SULFATE ION | 199 mg / 100 ml |
| $NO_3^-$ | NITRATE ION | 17.8 mg / 100 ml |
| Hg | MERCURY | 0.02 PPM* |

*  BY VOLUME

THE ANALYSIS WAS MADE ON THE COMPONENTS PARTICULARLY POISONOUS TO HUMAN BODY.

APPARATUS FOR PURIFYING EXHAUST GAS

This invention relates to an apparatus and a method for purifying exhaust gas discharged from an internal-combustion engine, and more particularly to an apparatus and a method of type in which particulates and liquid collected by an exhaust gas purifier are fed to a suction side of the engine with exhaust gas treated by the purifier.

Heretofore, there have been known apparatuses and method for purifying exhaust gas discharged from an internal combustion engine which utilize adiabatic expansion phenomenon and filtration operation using trapping materials such as stainless steel wool and the like. Such apparatuses and methods are described, for example, in the specifications and drawings of Japanese Pat. No. 456190 (Japanese patent publication No. 9643/1965) and Japanese Pat. No. 479358 (Japanese patent publication No. 5483/1966). Various other structures applying the same principle as the above mentioned apparatuses and methods are also known.

The above mentioned apparatuses and methods are all devised with intention to trap soot, heavy metals, sulfate ions, nitrate ions, and the like contained in exhaust gas, and have high trapping effects. However, various kinds of substances trapped by the above mentioned apparatuses and methods are required to be subjected to ultimate treatment as wastes.

This invention provides an apparatus wherein a part of the above mentioned wastes are recirculated to the engine system together with purified gas and treated by reignition and repurification. The combustion temperature is lowered by the circulation and reignition so that the generation of oxides of nitrogen such as nitric oxide and the like in the combustion chambers is inhibited.

FIGS. 1 and 2 are schematic views showing the arrangement of the various components in embodiments of the device according to the present invention;

FIG. 3 is an enlarged view of a purifier;

FIG. 6 is a graphical representation showing the relationship between the quantity of particulate trapped by the device according to the present invention, the axis of ordinate indicating the weight (gr) of trapped particulate being plotted on the ordinate and the running distance (km) being plotted on the abscissa;

FIG. 7 is a table showing the result obtained by quantitative analysis of trapped particulate; and FIG. 8 is a table showing the result obtained by analysis of trapped exhaust liquid.

Figure 4:
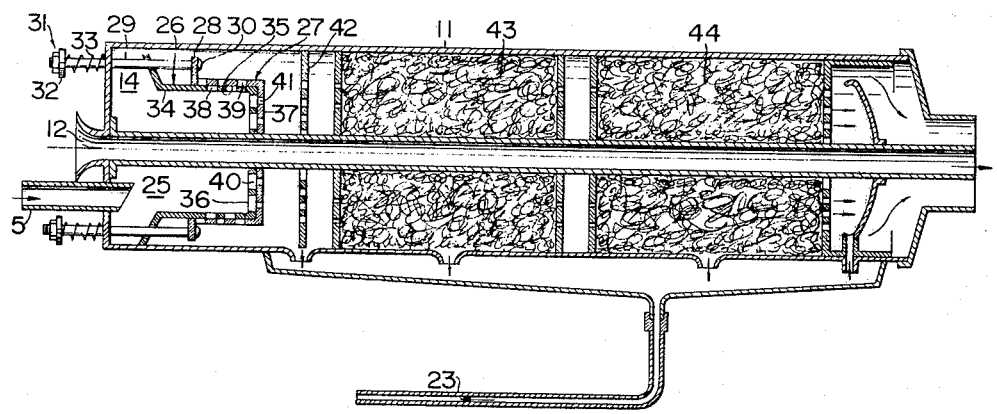
FIG. 4 is a vertical sectional view showing another embodiment of a purifier.
Figure 5:
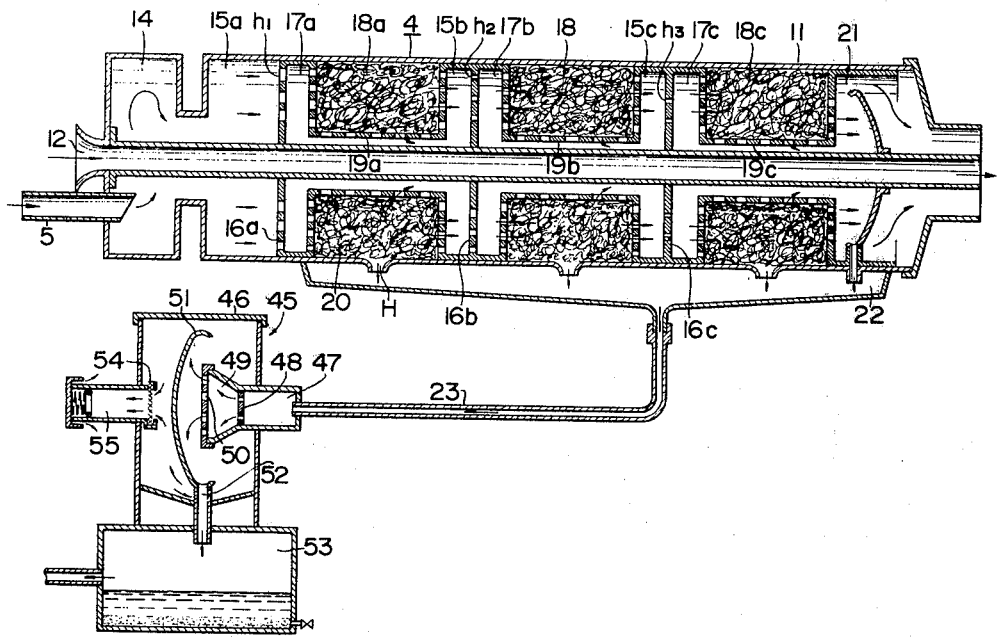
FIG. 5 is a vertical view showing a further embodiment of a purifier having an auxiliary purifier.

An embodiment of the present invention will be described more in detail with reference to the accompanying drawings.

FIGS. 1 and 2 are diagrams schematically showing the arrangement of the components of the embodiments of the invention. In FIGS. 1 and 2, reference numeral 1 designates an engine; 2, a carburator communicated with the engine through an intake manifold 3; 4, an exhaust gas purifier communicated through the engine exhaust pipe 5 with the engine exhaust side. Details of the exhaust gas purifier are shown in FIG. 3 and described hereinbelow. Reference numeral 6 designates a recovering pipe for conducting the trapped liquid and a part of the gas which has been subjected to purification by means of said exhaust gas purifier 4 from the exhaust gas purifier 4 to the intake manifold 3. The recovering pipe midway with a gas filter 7 and a flow controlling valve 8 in series connection.

FIG. 2 is a diagram showing a modification of the apparatus shown in FIG. 1 wherein a heat exchanging section 9 is provided in the vicinity of the exhaust side of the engine 1. The recovering pipe 6 passes through said heat exchanging section 9, and thereby the exhaust gas in the exhaust pipe is heat-exchanged with the gas in the recovering pipe 6 and undergone a decrease in temperature.

The structure and operation of the purifier 4 will be described hereinbelow in reference to FIG. 3. FIG. 3 is a cross sectional view showing the entire exhaust gas purifier. Reference number 11 designates a purifying cylinder provided internally with exhaust gas purifying devices and having at its center a ventilating pipe 12 for cooling the purifier. The inner part of cylinder 11 is partitioned in the longitudinal direction to form a plurality chambers. The exhaust pipe 5 is communicated with the inner part of a pretreatment chamber 14 at the forward most end of the purifying cylinder. In said pretreatment chamber 14 the exhaust gas is slightly cooled by weak adiabatic expansion.

Reference symbol 15a designates an expansion chamber which constitutes an adiabatic expansion chamber in combination with the following condensing chamber 17a which is separated therefrom by an adiabatic plate 16a having a number of small holes $h_1$. Exhaust gas passing through said adiabatic expansion chamber is caused to undergo adiabatic expansion and a decrease in temperature. Reference symbol 18a denotes a doughnut shaped trapping chamber within the purifying cylinder 11, the front, rear and inner walls of which are formed by a porous plate 19a. The inner part of said trapping chamber is filled with a heat-resisting trapping material 20 of stainless steel wool or the like which serves to condense the moisture within the exhaust gas passing through the inner part of said chamber into droplets each having as a nucleus a particle of soot or heavy metal. These droplets are condensed and grown and then adhere to the trapping material 20. Since the temperature of these water droplets is considerably lowered by the adiabatic expansion, said water droplets efficiently adsorb a large quantity of gas (carbon monoxide, hydrocarbon gases) sulfate ions, nitrate ions and the like.

A plurality of stages each constituted of an adiabatic expansion chamber and a trapping chamber of the type described are provided in a continuous series extending rearwardly. Each of the adiabatic expansion chamber have an adiabatic plate which is provided with holes having a diameter different from that of the other adiabatic plates to act according to the pressure and exhaust amount of exhaust gas. Gas which has been passed through the above mentioned chambers and purified leaves the exhaust chamber 11 provided at the rearmost end of the purifying cylinder and is discharged into the atmosphere.

Reference numeral 22 designates an exhaust liquid chamber provided at the lower end of said purifying cylinder and communicated through exhaust liquid holes H with the inner part of said purifying cylinder. The water droplets, that is, the exhaust liquid condensed in the cylinder through the recovering cylinder is derived from said exhaust liquid chamber. At the time of deriving the exhaust gas, a predetermined quantity of gas is accompanied as mentioned above.

The action of the device embodying the present invention constructed as mentioned above is generally described hereinbelow. The exhaust gas discharged from the engine 1 is purified by firstly passing through the purifying device and the greater part thereof is discharged into the atmosphere. The liquid which has been trapped in the purifier 4 and the residual gas are sent to the intake side of the engine 1 through the filter 7 and is mixed with the fuel together with fresh air and is supplied to the combustion chamber of the engine 1. Combustible substances in said liquid and gas are reignited. The cool liquid and gas introduced into the combustion chamber decrease the combustion temperature, thus suppressing the generation of oxides of nitrogen at the time the engine is in operation.

The flow control valve 8 is for controlling the amount of exhaust liquid and residual exhaust gas recycled in the engine. Said valve is controlled in accordance with the displacement of the engine and other conditions. It is desirable for maintaining good engine operation that the quantity of exhaust gas introduced into the intake side be limited to about 10% of the total intake.

Another embodiment of the exhaust gas purifying device used in the device according to the present invention will be hereinbelow described with reference to FIG. 4.

Similarly to the device shown in FIG. 3, this exhaust gas purifier comprises a purifying cylinder 11, a pretreatment chamber 14 and a cooling pipe 12 at the center thereof. On the far upstream end of the inner part of the purifying cylinder 11, there is provided substantially cylindrical adiabatic means 25. Said means 25 is provided coaxially with the purifying cylinder 11 and the ventilation pipe 12 and comprises a stationary part 26 fixed to said purifying cylinder 11 and a part 27 covering the downstream half portion of said stationary part 26 supported slidably in the longitudinal direction with respect to said part 26, said stationary part 26 acting as a guide for said sliding part 27.

The sliding part 27 has a flange 28 at the end part of the upstream side thereof. At equal intervals about the circumference of said flange there are provide a plurality of rods 29 each of which is fixed to said flange at one end 30. Rods 29 extend from flange 28 in the upstream direction pass through the end plate of said purifying cylinder 11 and project outwardly therefrom. The projecting end of each rod 29 is provided with a flange part 32 and a resilient means, such as a coil spring 33, is provided between the flange part 32 and the end plate of the purifying cylinder 11. The sliding portion 27 is pulled toward the end plate by the coil springs 33.

The stationary part 26 and the sliding part 27 have cylindrical parts 34 and 35 and annular plates 36 and 37 provided at the downstream ends thereof. A number of openings 38, 39, 40 and 41 are provided in said cylindrical parts 34, 35 and annual parts 36 and 37. While the openings 40 and 41 are in alignment with one another, the openings 40 of the annular plate 36 is considerably larger than the openings 41 of the annular plate 37. Accordingly, exhaust gas introduced into the pretreatment chamber 14 acts on the annular plate 37, thereby to press the movable part thereof in the downstream direction. The spring constant of the above mentioned spring is so selected that the movable part 27 slides a predetermined distance in for a given pressure of the exhaust gas.

The openings 38 of the cylindrical part 34 and the openings 39 of the cylindrical part 35 have the same shape. When the movable part 27 is at a position as shown in FIG. 4, that is, at the position of the movable part when the exhaust gas pressure is low, the corresponding openings are aligned in the longitudinal direction of the cylindrical but not superimposed on one another. With the increase of the pressure of the exhaust gas, the movable part 27 is pressed in the right-hand (downstream) direction, and the openings 38 of the movable part 27 is brought into alignment with the openings 37 of the stationary part 26. Thus the area of the openings formed by the superimposition of openings 38 and 39 varies relative to the pressure of the exhaust gas introduced into the preheating chamber 14 and adiabatic means 25 can therefore operate relative to the pressure of the exhaust gas. Furthermore, as the adiabatic plate indicated by reference numeral 42 in FIG. 4, the adiabatic plate for high pressure use can be especially provided. Reference numerals 43 and 44 designate trapping chambers.

As in the embodiment shown in FIG. 3, these chambers are filled with a heat-resisting trapping material such as stainless steel wool. This exhaust gas purifier operates similarly to the exhaust gas purifier shown in FIG. 3. However, since the exhaust gas purifier shown in FIG. 3 is provided with adiabatic plates acting separately at the time when the exhaust gas has low pressure, medium pressure or high pressure. In the case where the exhaust gas has high pressure, a resistance is generated and back pressure is increased at low pressure plate or middle pressure plate, as a result of which the efficiency of the apparatus is lowered. However, such difficulties are eliminated in the apparatus as shown in FIG. 4.

When the atmospheric temperature is high as in summer, the condensed liquid is collected at the exhaust liquid chamber and vaporized again while the exhaust liquid flows through the recovering pipe 6, and hence it is desirable that an auxiliary purifier 45 be provided.

The purifier 45 is provided in the recovering pipe 6 between the exhaust gas purifier and the filter 7, and is composed substantially of an auxiliary purifying cylinder 46. A cylindrical expansion chamber 47 receiving the liquid and gas introduced from the exhaust liquid chamber 22 is provided at the auxiliary purifying cylinder 46. On the downstream side of expansion chamber, there is arranged an adiabatic plate 48 having a number of holes on the downstream side of the expansion chamber. On the downstream side of the adiabatic plate there is provided a condensation chamber 49 of substantially frusto conical shape, and further on the downstream side of said chamber 49 these is provided an adiabatic plate 50 provided with a number of holes. The interior of the auxiliary purifying cylinder forms the condensation chamber for gas flowing through the holes of the adiabatic plate 50, and a deflecting plate 51 curved to aid the condensation operation is fitted in the interior of the auxiliary purifying cylinder. Gas flowing through the holes of the adiabatic plate 50 undergoes adiabatic expansion and is cooled and formed into droplets, which flow along the turning plate 51 and upon reaching the lower part thereof are introduced into a tank 53 mounted on the lower part of said auxiliary cylinder. The purified gas is exhausted through an exhaust pipe 55 by way of a filter 54. The liquid and gas which have been introduced into the tank 53 are passed back into the recovering pipe 6, and further sent to the engine through a suction device (not shown) or the like.

FIG. 6 shows the quantities of the particulates and liquid trapped versus the running distance of a vehicle in the case of using the device according to this invention. In this case, the average trapping ratio is about 70%. The trapping quantity versus km is about $15.7 \times 10^{-3}$ gr/km, and therefore, the exhaustion of particulate is very small.

This exhaust quantity of the particulates versus running distance km does not exceed the value of $30 \times 10^{-3}$ gr/mile ($18.7 \times 10^{-3}$ gr/kg) which is a value defined for 1980 in U.S.A.

The trapped exhaust particle are comprised of lead, manganese, zinc, barium, mercury and the like, as is evident from the results obtained in quantitative analysis as shown in FIG. 7.

In the case of using the present device on a car having a gasoline engine, a tank is provided for catching the exhaust liquid. As is evident from FIG. 8, it was found that the exhaust liquid contains a considerable quantity of sulfate ions and nitrate ions.

In the above described example, the device according to the present utility model has been described relative to a gasoline engine. The device according to the present invention can be basically applied without modification to a diesel engine. However, since the quantity of water discharged is small when the process of purification is applied to a diesel engine, there is almost no need to consider the discharge of the water. The suction gas operation in the case of a gasoline engine requires the introduction of pressure air, different from the case of a diesel engine, and hence the reflow of exhaust gas is effected at the air introduced portion and it is necessary to provide a pressure pump or the like (not shown) in the midway of said flow pipe line.

I claim:
1. A purifier for purifying exhaust gas discharged from an internal combustion engine, comprising:
   a purifying cylinder;
   a chamber in said purifying cylinder for pretreating the exhaust gas provided at the upstream most end of the purifying cylinder;
   an exhaust pipe communicated with the inner part of the pretreating chamber;
   a chamber in said purifying cylinder for adiabatically expanding the exhaust gas pretreated in the pretreating chamber, said chamber being located immediately downstream of the pretreating chamber;
   adiabatic plate means in said purifying cylinder between the pretreating chamber and the expanding chamber across the flow path, said adiabatic plate means having a number of openings;
   means for varying the total area of said openings automatically in response to the pressure of the exhaust gas;
   means in said purifying cylinder for trapping droplets formed by the adiabatic expansion in the expanding chamber; and
   an outlet on said purifying cylinder for exhausting the treated gas at the downstream most end of said purifying cylinder.

2. A purifier as defined in claim 1, including resilient biasing means mounted on the cylindrical casing at its one end, the other end being mounted on the movable section, said means controlling the movement of the movable section against the gas pressures.

3. A purifier as defined in claim 1 wherein said adiabatic means includes:
   a stationary section mounted on a cylindrical casing; and
   a movable section covering a downstream portion of the stationary section and mounted for moving thereon in the longitudinal direction of the cylinder.

4. A purifier as defined in claim 3, wherein both said sections comprise cylindrical portions and transverse portions extending across the cylindrical portions at the downstream end thereof, each transverse portion being formed with a plurality of openings, the openings in the transverse portion of the stationary section being larger than the openings in the transverse portion of the movable section, the cylindrical portions having openings therein of the same dimensions, whereby the movable section is displaced in operation in accordance with the gas pressure acting thereon and determines thereby the extent of overlap of the openings in the cylindrical sections and hence the total area of through-openings available to exhaust gas for adiabatic expansion of exhaust gas.

* * * * *